(12) United States Patent
Wang et al.

(10) Patent No.: US 11,349,839 B2
(45) Date of Patent: May 31, 2022

(54) SYSTEMS AND METHODS USING MODULAR USER INTERFACES FOR MANAGING NETWORK PERMISSIONS

(71) Applicant: Google LLC, Mountain View, CA (US)

(72) Inventors: Yuanzhen Wang, Redmond, WA (US); Matthew Terich, Seattle, WA (US); Tristan Andrew Swadell, San Carlos, CA (US); Elaine Lu, Kirkland, WA (US); Laura Rebeca Pina, Seattle, WA (US); John Josef Kloninger, Menlo Park, CA (US); Himanshu Agrawal, Kirkland, WA (US); Blake Michael Tyra, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 116 days.

(21) Appl. No.: 16/713,205

(22) Filed: Dec. 13, 2019

(65) Prior Publication Data

US 2020/0412724 A1  Dec. 31, 2020

Related U.S. Application Data

(60) Provisional application No. 62/868,417, filed on Jun. 28, 2019.

(51) Int. Cl.
*H04L 29/06* (2006.01)
*H04L 41/082* (2022.01)
(Continued)

(52) U.S. Cl.
CPC ............ *H04L 63/10* (2013.01); *G06F 3/0484* (2013.01); *G06F 8/34* (2013.01); *H04L 41/082* (2013.01);
(Continued)

(58) Field of Classification Search
CPC ... H04L 63/10; H04L 41/082; H04L 41/5096; H04L 63/20; G06F 3/0484; G06F 8/34
See application file for complete search history.

(56) References Cited

U.S. PATENT DOCUMENTS 5,760,788 A * 6/1998 Chainini ............ G09B 19/0053
345/474
5,956,715 A * 9/1999 Glasser ................... H04L 63/20
(Continued)

OTHER PUBLICATIONS

Extended European Search Report for EP20182935.5, dated Oct. 28, 2020, 8 pages.

*Primary Examiner* — William L Bashore
*Assistant Examiner* — Gregory A Distefano
(74) *Attorney, Agent, or Firm* — Dority & Manning, P.A.

(57) ABSTRACT

The present disclosure is directed to systems and methods for providing improved tools (e.g., user interfaces) that can be used for managing access permissions to cloud or other network resources. In general, the systems and methods include providing a user interface that can function in at least two modes which together can provide an improved user experience for intuitively and effectively developing code. As an example, the two interface modes can include a builder mode in which the user interface includes one or more interactive elements that enable a user to modularly build a set of computer-readable code that controls access permissions to one or more computing resources and an editor mode in which the user interface allows the user to directly edit the set of computer-readable code.

20 Claims, 14 Drawing Sheets

(51) Int. Cl.
    *H04L 9/40*         (2022.01)
    *H04L 41/50*       (2022.01)
    *G06F 3/0484*    (2022.01)
    *G06F 8/34*        (2018.01)

(52) U.S. Cl.
    CPC .......... *H04L 41/5096* (2013.01); *H04L 63/20* (2013.01)

(56) References Cited

U.S. PATENT DOCUMENTS

| | | | | |
|---|---|---|---|---|
| 7,631,290 | B1 * | 12/2009 | Reid | G06F 8/38 |
| | | | | 715/764 |
| 7,979,804 | B1 * | 7/2011 | Schang | G06F 9/451 |
| | | | | 715/763 |
| 8,387,006 | B1 * | 2/2013 | Taylor | G06F 16/958 |
| | | | | 717/110 |
| 2003/0188198 | A1 * | 10/2003 | Holdsworth | G06F 21/6218 |
| | | | | 726/1 |
| 2005/0262480 | A1 * | 11/2005 | Pik | G06F 8/20 |
| | | | | 717/120 |
| 2006/0212543 | A1 * | 9/2006 | O'Farrell | G06F 16/25 |
| | | | | 709/219 |
| 2008/0034412 | A1 * | 2/2008 | Wahl | G06F 21/41 |
| | | | | 726/8 |
| 2008/0235231 | A1 * | 9/2008 | Gass | G06F 21/6227 |
| 2012/0084758 | A1 * | 4/2012 | Bates | G06F 11/3656 |
| | | | | 717/125 |
| 2012/0291011 | A1 | 11/2012 | Quine | |
| 2017/0214695 | A1 | 7/2017 | Chachar et al. | |
| 2019/0026083 | A1 * | 1/2019 | Abrahami | G06F 3/0486 |
| 2020/0412726 | A1 * | 12/2020 | Nevatia | G06N 20/00 |

\* cited by examiner

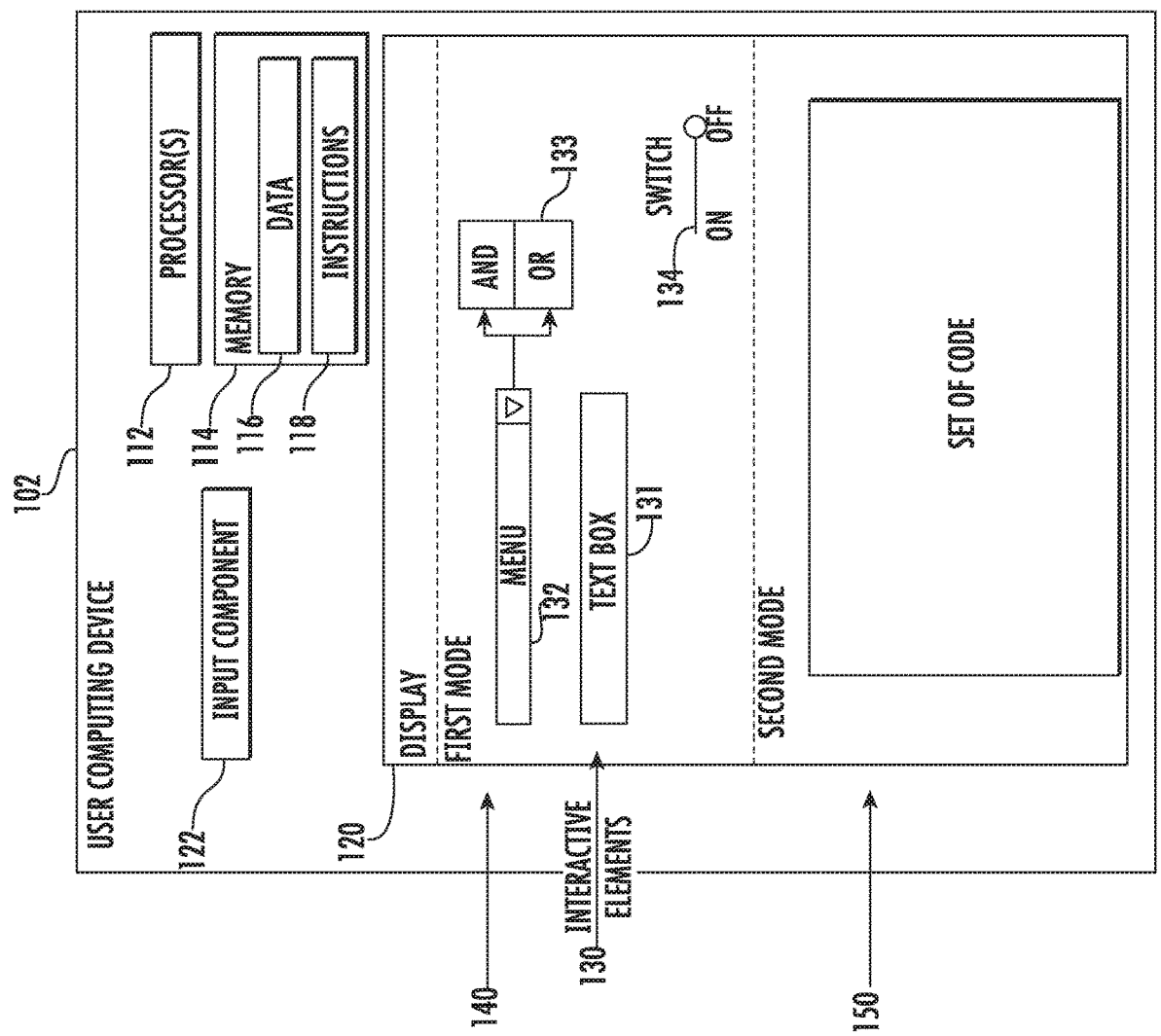
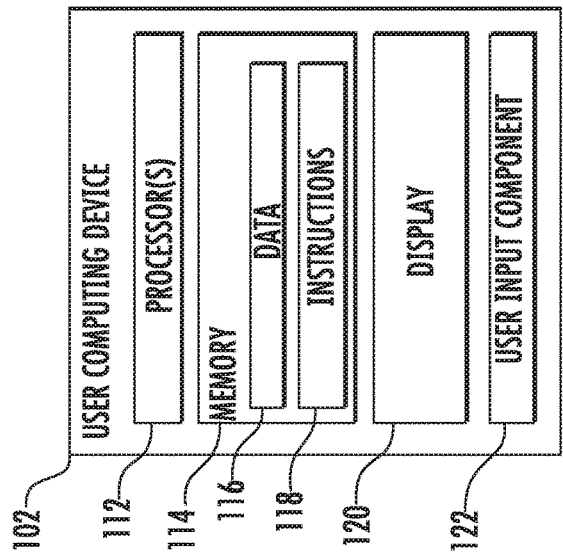

CREATE CONDITION

TITLE
RESOURCE VALIDATION

DESCRIPTION
THIS WILL CHECK RESOURCE TYPE AND NAME

CONDITION BUILDER | CONDITION EDITOR — 504

```
1
2
3
4  (RESOURCE.TYPE == "STORAGE.BUCKETS" &&
5  RESOURCE.NAME.STARTSWITH("B1"))
6
7  (RESOURCE.TYPE == "STORAGE.OBJECTS" &&
8  RESOURCE.NAME.STARTSWITH("PHOTOS") &&
9  REQUEST.TIME > TIMESTAMP("2018-08-15T22:01:28:00"))
10
11
12
13
14
15
```

— 506
— 508
— 520
500

SAVE | CANCEL

FIG. 5B

SYSTEMS AND METHODS USING MODULAR USER INTERFACES FOR MANAGING NETWORK PERMISSIONS

CROSS REFERENCE TO RELATED APPLICATIONS

This application claims priority to U.S. Provisional Patent Application Ser. No. 62/868,417, filed on Jun. 28, 2019 the contents of which are incorporated herein by reference in their entirety.

FIELD

The present disclosure relates generally to systems and methods for managing permissions to computing resources. More particularly, the present disclosure relates to computing systems and methods configured to provide a modular user interface that can be used for applications such as managing said permissions.

BACKGROUND

An administrator defining access permissions may be required to input permissions for each member of her team, thereby ensuring that the correct set of people access the right kind of resources or applications. In some instances, these permissions may be defined in the form of a set of computer-executable code that allows a particular team member to access a resource and/or to act according to a certain role or identity only when a certain set of configured conditions or rules are met or satisfied. Thus, when conditions exist, the role is only granted to the member if the condition evaluates to true.

In certain existing systems, the mechanism to define a condition is by writing the condition using a policy language (e.g., common expression language (CEL)). For example, the condition can be written by writing the condition in a text box. This means infrastructure administrators and/or identity and access management administrators are required to learn the grammar and syntax of one or more policy languages to be able to correctly define the conditions through such existing systems. While policy languages such as CEL allow the expression of a large set of policies through conditions, it may be challenging for a novice or unskilled administrator to learn and correctly use such language. Thus, while writing conditions in CEL syntax works for security developers, this may not be the case for infrastructure administrators and/or identity and access management administrators that do not have a developer background. Furthermore, the creation of conditions by an unskilled administrator may result in security vulnerabilities as the conditions may not be correct or crafted with sufficient specificity.

SUMMARY

Aspects and advantages of embodiments of the present disclosure will be set forth in part in the following description, or can be learned from the description, or can be learned through practice of the embodiments.

Generally, the present disclosure is directed to systems and methods for providing improved tools (e.g., intuitive user interfaces) that can be used for managing access permissions to cloud or other network resources. In general, the systems and methods include providing a user interface that can function in at least two modes which together can provide an improved user experience for intuitively and effectively developing code. As an example, the two interface modes can include a builder mode in which the user interface includes one or more interactive elements that enable a user to modularly build a set of computer-readable code that controls access permissions to one or more computing resources and an editor mode in which the user interface allows the user to directly edit the set of computer-readable code. Using such a multi-interface system can allow a novice such as an unskilled service user or administrator, who may be unfamiliar with coding syntax or the programming language, to visually and/or modularly build code in an intuitive manner (e.g., via interaction with the interface in the builder mode). Implementations of the disclosure can be integrated into a cloud service for example through an application programming interface (API) that can be used to generate code that implements one or more access controls according to the API of the cloud service.

One example aspect of the present disclosure is directed to modularly building code by modifying one or more interactive elements displayed according to a first mode of the interface.

Another example aspect of the present disclosure is directed to the automated generation of computer-readable code based on receiving a user interaction with the one or more interactive elements.

Another example aspect of the present disclosure is directed to adjusting and/or updating the computer-readable code by editing the code in a text format according to a second mode of the interface. Additionally or alternatively, a user may update the computer-readable code by modifying and/or rearranging the order of interactive elements, including ones having been modified to set a value.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 1A and 1B depict a block diagram of an example computing system according to example embodiments of the present disclosure.

FIGS. 5A and 5B depict images of example user interactions with an example user interface in accordance with embodiments of the present disclosure.

Figure 2:
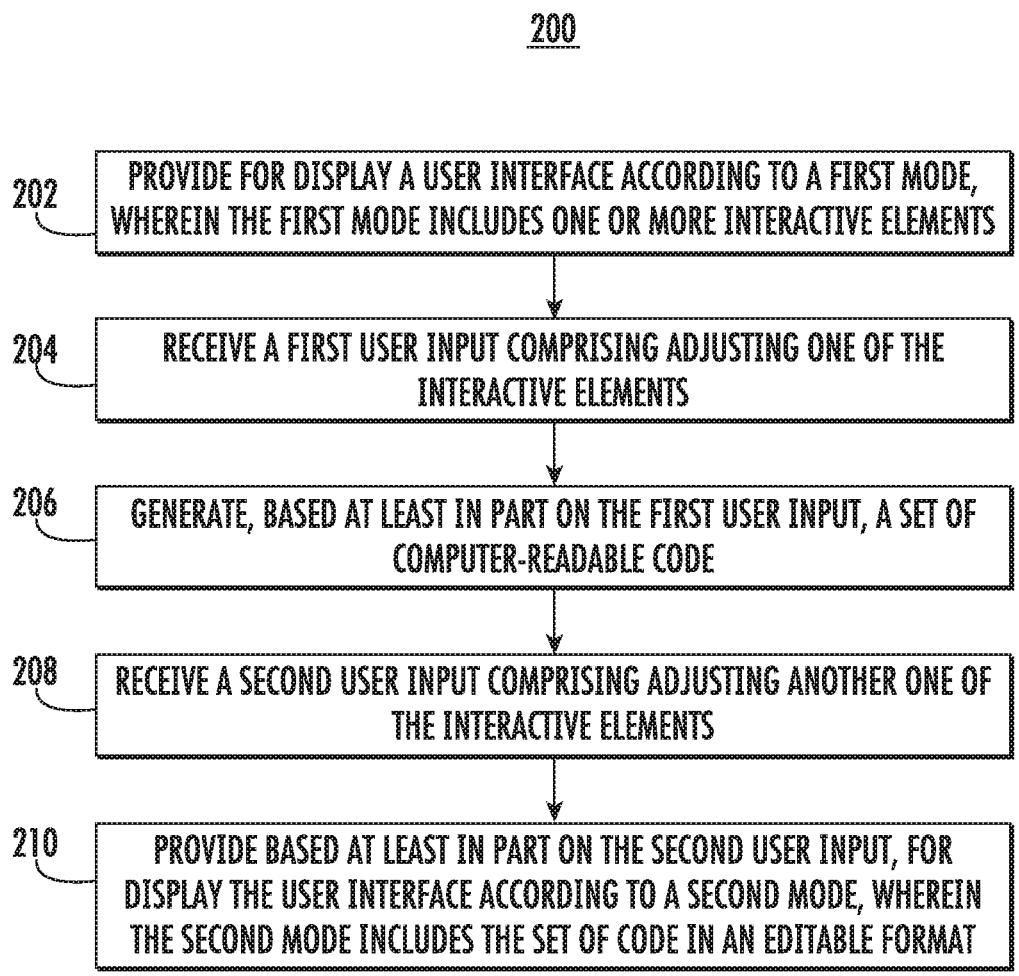
FIGS. 2 and 3 depict a block diagrams of example methods for controlling access to a cloud resource according to example embodiments of the present disclosure.

Reference numerals that are repeated across plural figures are intended to identify the same features in various implementations.

DETAILED DESCRIPTION

Overview

The present disclosure is directed to systems and methods for providing improved tools for managing access permissions to cloud or network resources, which may be referred to as identity and access management. In general, the systems and methods include providing a user interface that can function in at least two modes which together can provide an improved user experience for intuitively and efficiently developing code. For example, the two interface modes can include a builder mode and an editor mode. In the builder mode, the user interface can include one or more interactive elements that enable a user to modularly build a set of computer-readable code that controls access permissions to one or more computing resources. In the editor mode, the user interface can allow the user to directly edit the set of computer-readable code. Using such a multi-modal interface system can allow a novice such as an unskilled service user or administrator, who may be unfamiliar with coding syntax or the programming language, to visually and/or modularly build code in an intuitive manner (e.g., via interaction with the interface in the builder mode). As the user gains experience, the computer-readable code can be accessed through the editor mode, which enables the user to more specifically and granularly modify the generated code, such as inserting complex code portions that cannot be input or that cannot easily be input using the builder mode.

In some implementations, the proposed systems and methods can be included in or otherwise provided as a portion of a cloud computing service. An administrator of the cloud computing service can interact with the user interface to generate computer-readable code that, when executed by the cloud computing service, controls access permissions to one or more cloud computing resources included in, accessed via, or otherwise associated with the cloud computing service. Thus, the proposed systems and methods can be provided as part of a cloud computing service to generate code specifically tailored to control access to the system being administered. For example, the user interface can be provided as part of a cloud computing service package. The user interface can enable generation of code (e.g., by an administrator) that can be executed by the cloud computing service to control access to resources of the service.

One benefit of this scheme (e.g., the user interface being provided as part of the same cloud service for which access permission are being generated) is that the code built using the user interface can be specifically tailored to the particular cloud computing service. As one example, an application programming interface (API) can be associated with the cloud computing service. The API can include a set of predefined functions or other units of computer-readable code. In some implementations, the builder mode of the user interface can enable an administrator to modularly build the set of computer-readable code that complies with the API through use of a plurality of predefined application programming interface snippets. That is, predefined snippets of API-compliant code can be mixed, matched, edited, combined, etc. according to various rules to facilitate modular building of access control code based on user input.

More particularly, as described above, an administrator defining access permissions may be required to input permissions for each member of her team, thereby ensuring that the correct set of people access right kind of resources or applications. In some instances, these permissions may be defined in the form of a set of computer-executable code that allows a member to access a resource and/or to act according to a certain role only when a certain set of conditions or rules are met or satisfied. While some administrators may be familiar with coding syntax, text is not easily evaluated visually. To alleviate this problem, the present disclosure provides systems and methods that enable an improved user interface that focuses on supporting conditions agnostic of the policy language. This will allow infrastructure or identity and access management administrators, for example that do not have a developer background, to create conditions. In some implementations, a guided user interface can focus on task-driven structured forms and can lower the barrier of adoption as the administrator or other user can now focus on the goal of granting access based on a condition and not learn the syntax and grammar of the policy language. Additionally, it can be a tool to help administrators or other users learn about the policy language by viewing and copying the condition in the language (e.g., CEL) syntax after the condition has been built through the interactive user interface (e.g., in the editor mode). Although aspects of the present disclosure are directed to a user interface for the development of conditions for member permission to cloud and networks resources, the described user interface can also be extended to generation of computer-executable code in the context of network security (e.g., a web application firewall to protect workloads from DDoS attacks) and/or other condition-based schemes.

An example aspect of the systems and methods can include providing the user interface including at least two input modes to a user. In general, instructions for providing the user interface can be stored on non-transitory computer readable media that can be present on a local device such as a computer or smart phone. Alternatively or additionally, the non-transitory computer readable media may be present on a remote device such as a server that may be accessed by a local device using a communications protocol and/or API.

In particular, in some implementations, a computing system can operate to provide to an administrator a user interface having a first mode (e.g., a builder mode) that can provide visual representations for building one or more conditions that control user permissions. For instance, a dropdown menu may be used to select one or more users to grant access permissions to a certain resource. After making these selections, a new menu may be generated based on the prior selections that can be used to select a condition (e.g., a time or date) for accessing the resource. For instance, an API associated with the computing system may include definitions for setting resource permissions for a group based on a set of characteristics. The set of characteristics may be restricted by the API to a set of choices that can be presented to the administrator when making selections using the interface. Additionally, certain choices may require a user specified input based on instructions included in the API. When an administrator selects a choice requiring a user input, the builder mode can be configured to access the type of input based at least in part on the API and provide a user interface element such as a text box that can receive a user input. Thus, information included in the API may be used to determine the type of user interface element, as well as choices/options that can be associated with the user interface element. As permissions and conditions continue to be set by the administrator, these selections can be organized as a hierarchy to provide groupings such as users granted access to a certain resource or logical conditions such as users having access to the resource weekdays between 9:00 A.M and 5:00 P.M. Thus, in general, the menu options and permissions space provided by the user interface can be tailored to the specific settings being modified and/or in view of the specific API or other structures of the specific cloud service for which code is being generated.

In addition to displaying and/or organizing the permissions in the first mode, the administrator can access a second mode displaying the computer readable version of the code, which is generated based on the selections made in the first mode. In the second mode (e.g., an editor mode), the administrator can interact with a text version of the code for the purpose of editing and/or further refining the code or to improve her knowledge of the underlying coding syntax.

Generally, aspects of the builder mode include displaying one or more interactive elements such as text boxes, drop-down menus, buttons, check boxes, switches, or similar user interface graphics. In certain implementations, the builder mode can generate additional interactive elements based on receiving a user interaction with one of the interactive elements. For example, a user interacting with an example user interface displayed on a smartphone may utilize a touch screen to select a category from a drop-down menu when in the builder mode. After selecting a category (e.g., a resource type), a new interactive element or elements can be generated to prompt selection of the resource type (e.g., storage bucket). Additional user interactions such as typing, voice input, or other interactions may also be used to modify elements displayed in the builder mode (e.g., for the purpose of selecting and/or setting one or more conditions.)

Upon receiving the user interaction, computing systems and methods disclosed herein may generate a corresponding computer-executable code that includes instructions for performing the operations selected according to the first mode. In some implementations, a portion or all of the corresponding code may be displayed in the builder mode so that a user can dynamically see how her selections translate to the coding syntax. As an example, user interfaces according to this disclosure may display the builder mode and the editor mode in a single interface such as by segmenting the interface into two regions (e.g., top-bottom, left-right, etc.) As another example, user interfaces according to this disclosure may display the corresponding code or a portion of the corresponding code as a non-editable notation while the user is in the builder mode. In certain implementations, none of the corresponding code may be displayed in the builder mode unless a user toggles one of the interactive elements to display the corresponding code. Thus, a variety of arrangements are contemplated for the user interface and displaying each mode when interacting with the user interface. In some implementations, the user interface can include a builder arrangement to specify an experience level of the user. This builder arrangement can be used to set a default arrangement for displaying the builder mode, the editor mode, or aspects of each mode on a single interface screen.

Another aspect of the builder mode can include providing one or more help elements that can allow a user to test whether the code they have built runs without error when executed or to suggest an input and/or input type for one of the interactive elements. In general, these help elements can be displayed dynamically such as only when interacting with an icon (e.g., hovering over the icon or another help element present on the user interface.) Alternatively, some or all of the help elements can be displayed as static information such as text below the interactive element.

Further aspects of the builder mode may include providing for display one or more logic groupings to segment the selections into a hierarchy. For example, it is common in programming to select logical operators such as and, or, not, etc. to create complex queries and/or specify unique conditions. In some implementations, the builder mode may be configured to display groupings separated based on the selection of a logical operator. These logic groupings may contain one or more interactive elements that can individually be modified. Additionally, these logic groupings may be modified as a whole, such as by dragging and dropping one or more of the logical groupings into a different logical grouping to create a nested grouping. In this manner, as the interactive elements displayed on the user interface are adjusted, the corresponding code may update to represent the new conditions displayed in the builder mode.

Aspects of the editor mode can include providing for display an editable version of the corresponding code generated based on the user interactions in the builder mode. In some implementations, the user interface may require receiving a user input to provide displaying the editor mode. For example, the user interface may include an interactive element to toggle on and off displaying the editor mode Generally, the editable version of the corresponding code can be provided in the form of a text box that a user can directly interact with or that can be exported for editing in a different interface.

As used herein, the corresponding code includes computer-readable instructions that substantially represent the totality of user interactions with the one or more interactive elements. Since the corresponding code represents each of the user interactions, the systems and methods disclosed herein may provide user interfaces that dynamically update such that the corresponding code is generated for display in substantially real time. For example, as each user interaction is received according to the builder mode, the corresponding code can automatically update and be provided for display according to the editor mode. Alternatively, in some implementations, the computing systems and methods may generate the corresponding code for display in the builder mode based in part on a user interaction such as switching to the editor mode or interacting with a help element.

Example methods for defining user permissions or setting conditions are also disclosed that may be practiced in combination with the methods and systems provided herein. For instance, a method for controlling access to a cloud resource can include: providing for display a user interface which includes a first mode depicting one or more interactive elements, receiving a first user input adjusting one of the interactive elements, and generating, based at least in part on the first user input, a set of code. In some implementations, the method can also include providing for display a second mode displaying the set of code in a text editable format such that the first mode and the second mode are displayed together on the user interface. In some implementations, the second mode may be provided for display only on receiving a certain user interaction. Thus for certain implementations, the first mode can include an interactive element for selecting displaying the first mode, the second mode, or switching between displaying the first mode and the second mode.

In some implementations, the method for controlling access to a cloud resource can also include updating the one or more interactive elements based on receiving the first user input. For example, upon receiving a user interaction such as the selection of an item from a drop-down menu, the user interface may include instructions for generating a new interactive element such as another drop-down menu, a text box, etc. In general, it should be understood that updating the one or more interactive elements need not mean that each of the one or more interactive elements provided for display must update or change. In some cases, most or a majority of the one or more interactive elements may not update or change.

Additionally, in certain implementations, updating the one or more interactive elements can also include organizing a subset of the one or more interactive elements into a grouping and providing for display the grouping. In some implementations, one or more groupings each including a unique subset of the one or more interactive elements may be generated and organized into a hierarchy and updating the one or more interactive elements can include providing for display the hierarchy.

As an example of technical effect and advance, implementations of the present disclosure provide intuitive systems and methods that can allow the testing and development of permissions (e.g., for cloud access) by both experienced and novice developers. By defining permissions according to an intuitive first mode and concurrently generating corresponding code, a novice developer may quickly grow her understanding of the syntax for a new programming language. Additionally, users such as administrators or managers may share the permissions defined according to the first mode with other coworkers who lack a knowledge of programming to provide a visual representation of the underlying code. Furthermore, the conditions and corresponding codes generated through use of the present disclosure may provide improved security and access control relative to conditions developed by an unskilled or novice administrator attempting to directly write the code itself. Thus, the security performance of the computing system itself can be improved.

While there are some existing interfaces that attempt to translate user selections into a computer readable query, these have demonstrated issues due to their rigidity. Often the development of permissions and especially complex permissions requires iterating over multiple conditions or arrangements of conditions. Implementations of the disclosure are directed to systems and methods that provide flexible user interfaces that adapt based on user input. The flexible user interfaces can provide intuitive modes for growing a user's familiarity with the coding syntax, while also allowing experienced developers to modify the underlying code.

Example Devices and Systems

FIG. 1A depicts a block diagram of an example computing system such as one including a user computing device 102.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

Generally, the user computing device 102 can include a display 120. For example, the display 120 can be or can otherwise include hardware configured to provide imagery to a user. Several non-limiting examples of a display 120 can include a phone screen, a computer monitor, or other similar visual display devices. As shown in FIGS. 1A and 1B, the display 120 may be included as part of the user computing device. Alternatively, in some implementations, the display 120 can be separate from the user computing device 102 and may receive imagery for display from a remote computing system such as a server or computer through a wireless or hardwired connection.

More particularly, as shown in FIG. 1B, the display 120 can be configured to provide a user interface according to a first mode and a second mode. The first mode can include one or more interactive elements 130 such as a text box 131, dropdown menu 132, button 133, switch 134, etc. that can be modified by receiving a user interaction such as a click or touch. In some implementations, the user interface can be toggleable such that upon receiving a user interaction, the user computing device, 102 can provide for display the user interface according to the first mode 140, the second mode 150, or both the first 140 and second mode 150. Thus, while both modes are depicted in FIG. 1B it should be understood that the user interface can be configured to display (e.g., by receiving a user interaction) at any time only the first mode, only the second mode, or both the first and second mode.

The user computing device 102 can also include one or more user input components 122 that can receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In general, the one or more processors 112 (included as part of the user computing device or housed on a remote computing system) can be any suitable processing device (e.g., a processor core, a microprocessor, an ASIC, a FPGA, a controller, a microcontroller, etc.) and can be one processor or a plurality of processors that are operatively connected. The memory 114 (included as part of the user computing device or housed on a remote computing system) can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the computing system to perform operations.

In some implementations, the remote computing system can include or otherwise be implemented by one or more computing devices. In instances in which the remote computing system includes plural computing devices, such computing devices can operate according to sequential computing architectures, parallel computing architectures, or some combination thereof.

The wireless connection can include one or a combination of communications networks, such as a local area network (e.g., intranet), wide area network (e.g., Internet), or some combination thereof and can include any number of wired or wireless links. In general, communication over the network can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Methods

Figure 3:
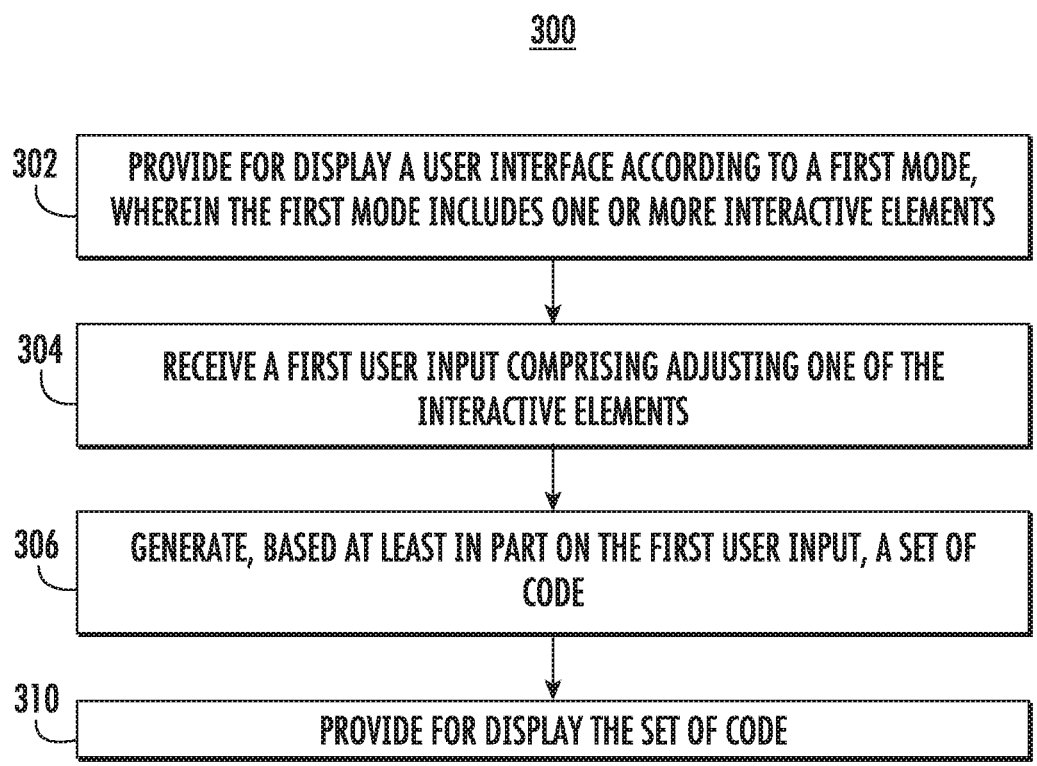

FIGS. 2 and 3 depicts flow chart diagrams of example methods to guide user interactions using an intuitive user interface. These methods can build computer readable code without the need of a user to have specific expertise in an expression language and can be used to define permissions for tasks such as cloud access in accordance with example embodiments of the present disclosure. Although FIGS. 2 and 3 depict steps performed in a particular order for purposes of illustration and discussion, the methods of the present disclosure are not limited to the particularly illustrated order or arrangement. The various steps of the methods 200 and 300 can be omitted, rearranged, combined, and/or adapted in various ways without deviating from the scope of the present disclosure.

With reference to FIG. 2, at 202, a computing system can provide for display a user interface according to a first mode, the first mode including one or more interactive elements. In an example implementation, each of the one or more interactive elements are interrelated and can be toggled to set one or more values to define different logical combinations of conditions that must be met for access to be granted.

At 204, the computing system can receive a first user input including adjusting one of the interactive elements (e.g., to set a value such as a user, an access time, an access resource, etc.). As an example implementation, the first user input can include a touch or click interacting with a device included in the computing system to modify one of the interactive elements or to rearrange a grouping of multiple interactive elements.

At 206, the computing system can generate, based at least in part on the first user input, a set of computer-readable code. In general, the computer-readable code may embody actions based on the first user input. For example, using a drop-down menu to select a certain user for setting a permission can generate computer-readable code for associating the user with the permission. In some implementations, this code can be generated without necessarily being executed. Thus, generating the set of computer-readable code can, in certain implementations, be performed without executing the code to set the user permission.

At 208, the computing system can receive a second user input that includes adjusting another of the interactive elements. In some implementations, one of the interactive elements can include a mode toggle, such that upon receiving a user input to modify the element, the user interface can adjust or update.

As an example implementation of adjusting the user interface, at 210, the computing system can provide, based at least in part on the second user input, for display the user interface according to a second mode. In general, the second mode includes the set of computer-readable code in an editable format that may be used to further refine the permissions beyond the selections made according to the first mode.

With reference to FIG. 3, at 302, a computing system can provide for display a user interface according to a first mode, the first mode including one or more interactive elements.

At 304, the computing system can receive a first user input which includes adjusting of the interactive elements.

At 306, the computing system can generate, based at least in part on the first user input, a set of code.

At 310, the computing system can provide for display the set of code.

In some implementations according to the disclosure, such as shown in FIG. 3, the systems and methods can include user interfaces that may dynamically display the set of computer-readable code without the need to toggle or otherwise interact with one of the interactive elements. Further the set of computer-readable code, may be displayed according to a first mode in a non-editable format, according to a second mode in a text-editable format, or both simultaneously on the user interface. For example, as the user modifies the user interactive elements, the set of computer-readable code can be generated and displayed substantially in real time. In some implementations, the computer-readable code can be displayed according to a second mode shown alongside the first mode, the second mode providing the code in a text-editable format. Additionally or alternatively, the computer-readable code can be displayed according to a first mode in a non-editable format that can be displayed substantially in real time as a user modifies the interactive elements. Thus, implementations of the disclosure contemplate various arrangements for providing the user interface according to the first mode and/or the second mode.

Example Interfaces

Figure 4A:
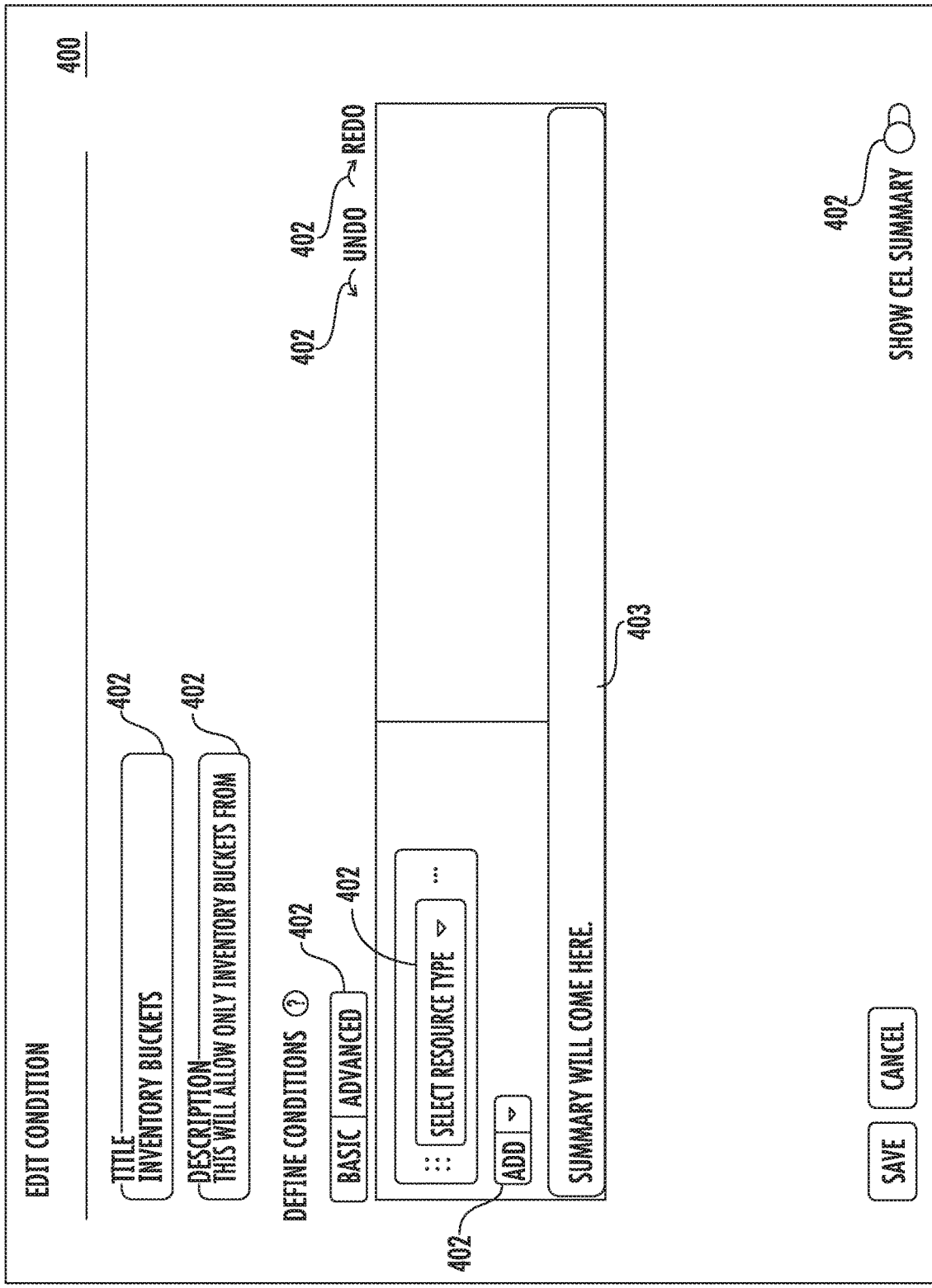
FIGS. 4A-4I depict images of example user interactions with an example user interface in accordance with embodiments of the present disclosure.

FIGS. 4A-4I depict example images of operations that can be performed in accordance with example embodiments of the disclosure. For instance, in FIG. 4A an example interface 400 is depicted according to a first mode including one or more interactive elements 402. Also displayed in FIG. 4A is a non-editable region 403 for displaying a summary of the conditions defined by receiving a user interaction(s). This region 403 can be toggled on and off for display, for example by interacting with one of the interactive elements 402 (e.g., Show CEL summary switch).

Figure 4B:
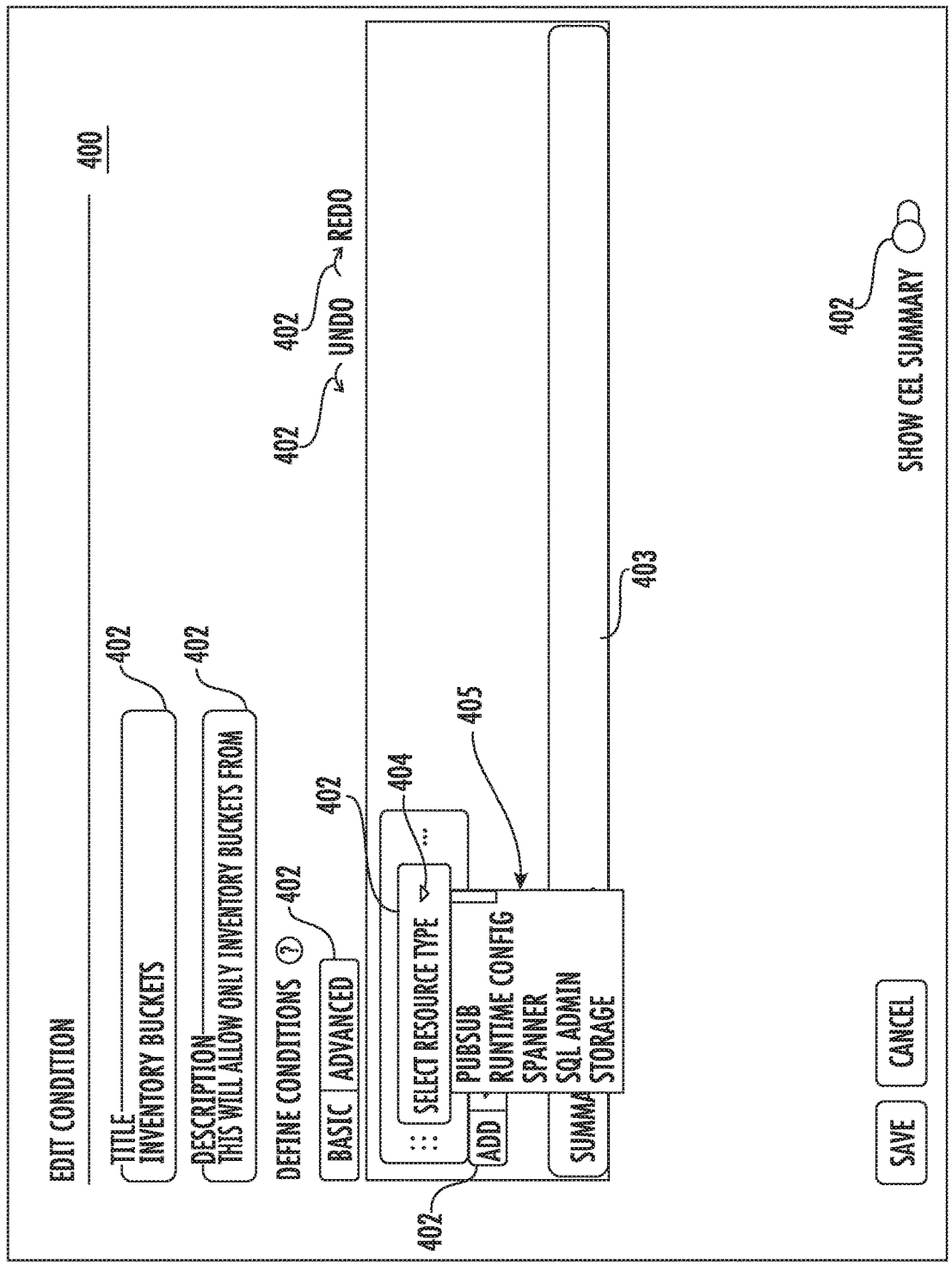

FIG. 4B displays an example result of a user interaction with one of the one or more interactive elements shown in FIG. 4A. As shown, a user interaction such as clicking the dropdown menu 404 can provide a selection of options 405 from which a user can chose an option. Example options 405 may be predefined such as by designating that resource type includes: pubsub, runtime config, spanner, SQL admin, and storage. Alternatively, the options 405 presented may depend on one or more prior user interactions.

Figure 4C:
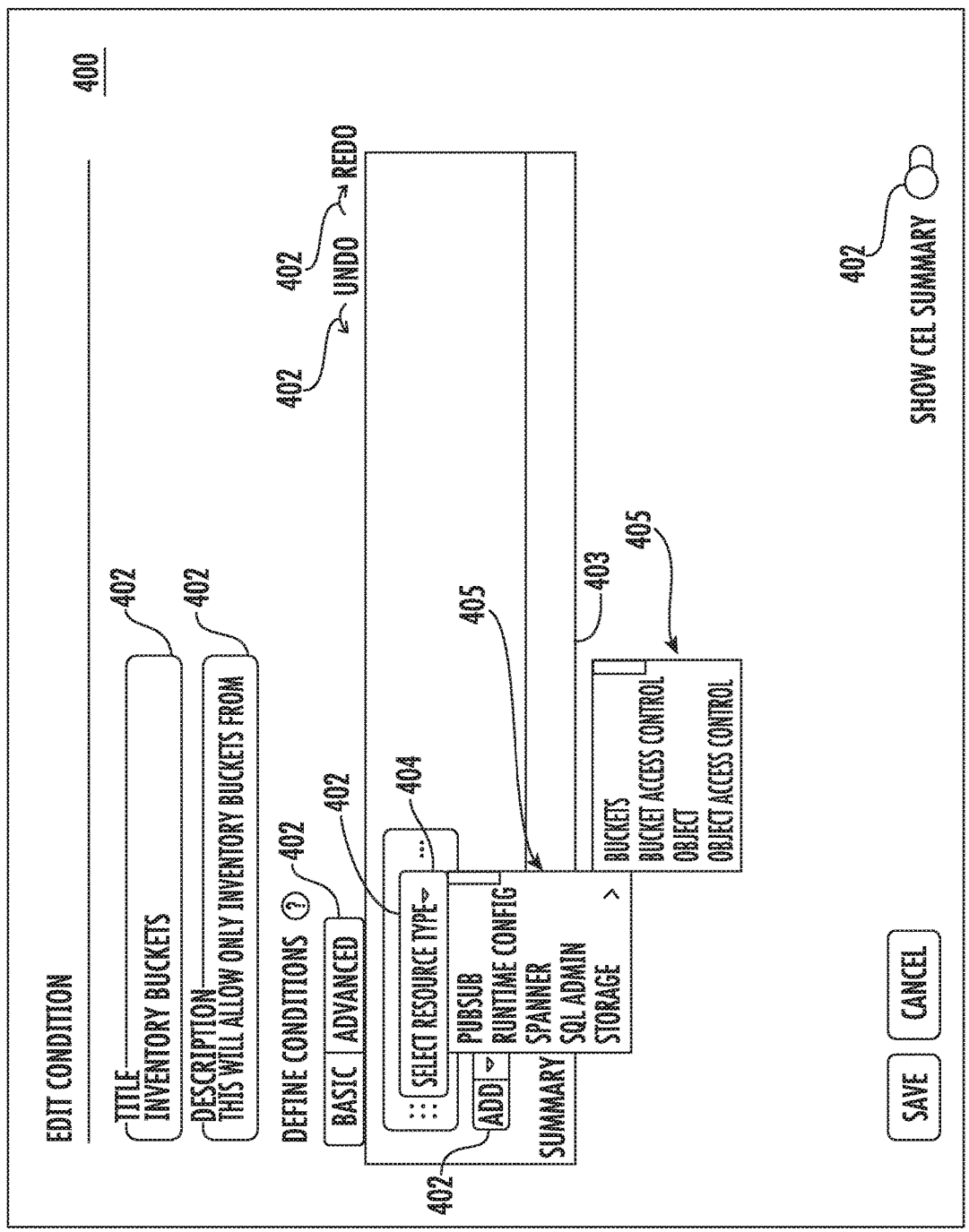

FIG. 4C displays another example result of a user interaction with the one or more interactive elements 402. In some cases, the interaction may result in the interactive element spawning or otherwise providing for display one or more new selection options 405 (e.g., as part of embedded dropdown menu).

Figure 4D:
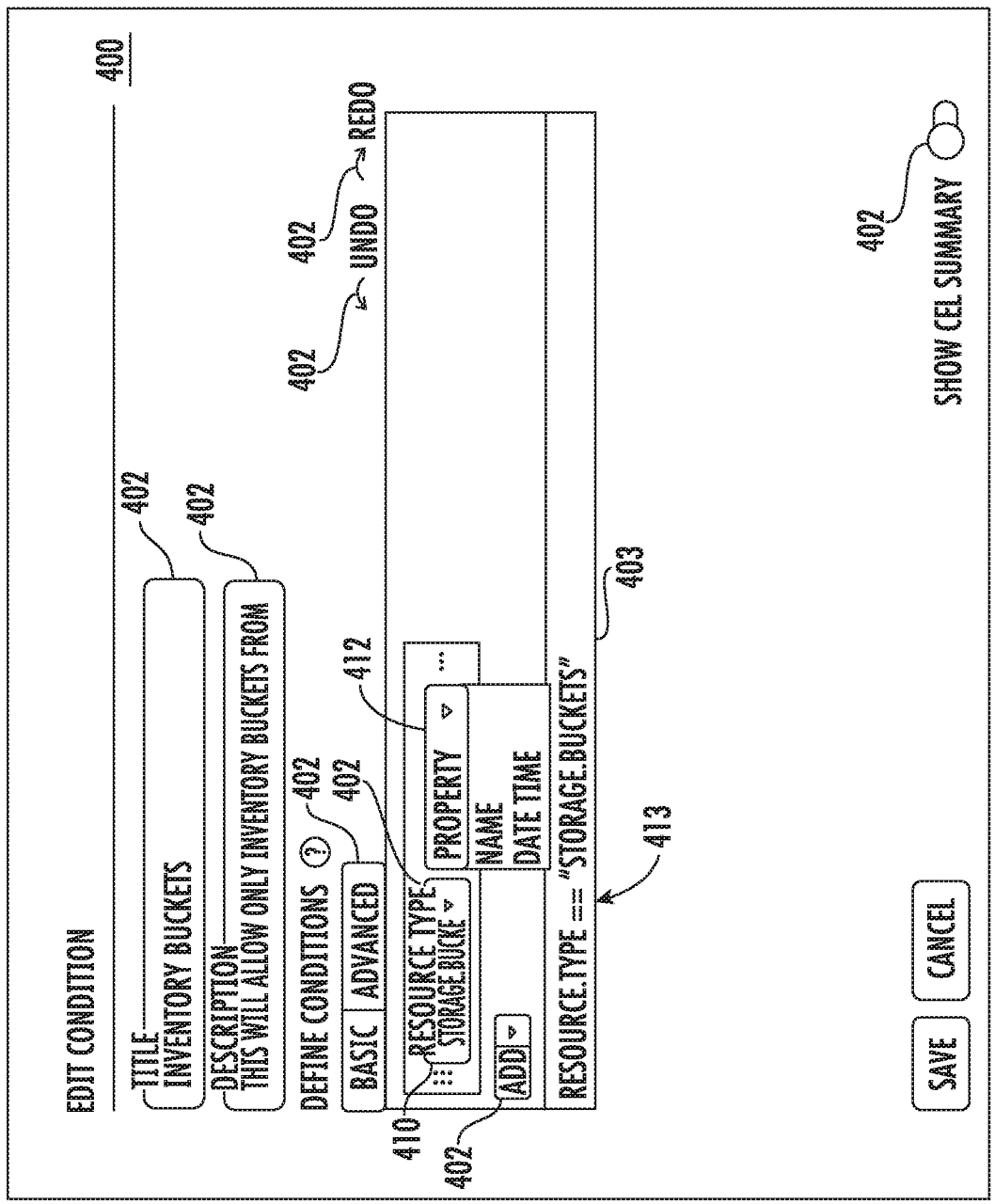

FIG. 4D displays an example result of a user interaction after selecting one of the options. For example, after selecting "storage buckets" 410 as the resource type, a new interactive element 412 (e.g., a dropdown menu) can be generated and displayed to the user. Additionally, FIG. 4D depicts the generation of computer readable code 413 based on the user selection for resource type.

Figure 4E:
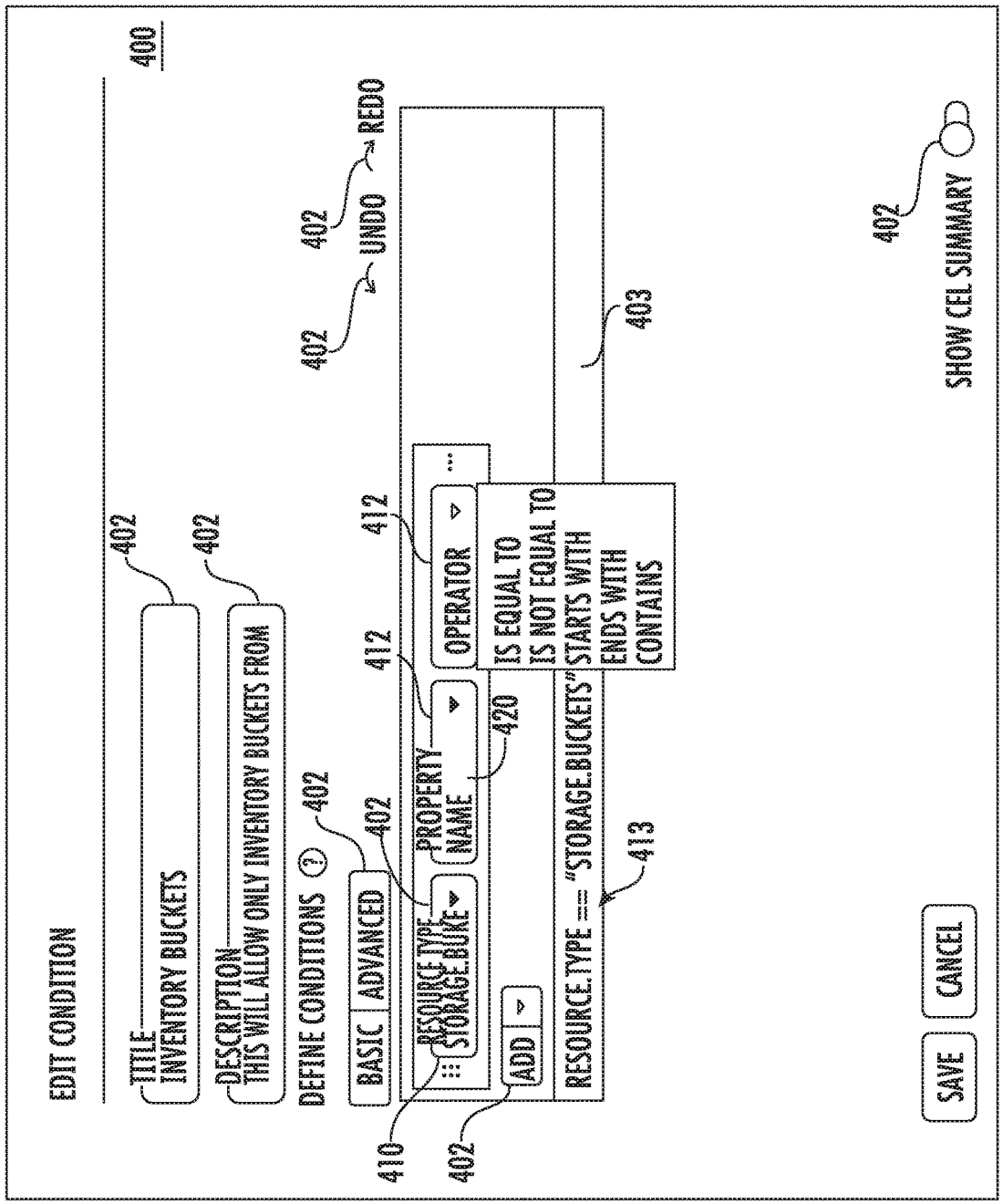

In FIG. 4E, the user interface of FIG. 4A is depicted after receiving the user interactions illustrated in FIGS. 4B-4D. As shown, the user interaction selecting "name" 420 as the property generates an additional new interactive element 412 (e.g., a dropdown menu). In some implementations, the user interface may include pre-defined logic that includes instructions for how new interactive elements 412 may be suggested or generated for presentation to a user. For instance, the selection of resource type "storage buckets" 410 and the property "name" 420 may indicate that a new interactive element 412 providing a comparison operation should be generated. Several non-limiting examples of operators include: is equal to, is not equal to, starts with, ends with, and contains.

Figure 4F:
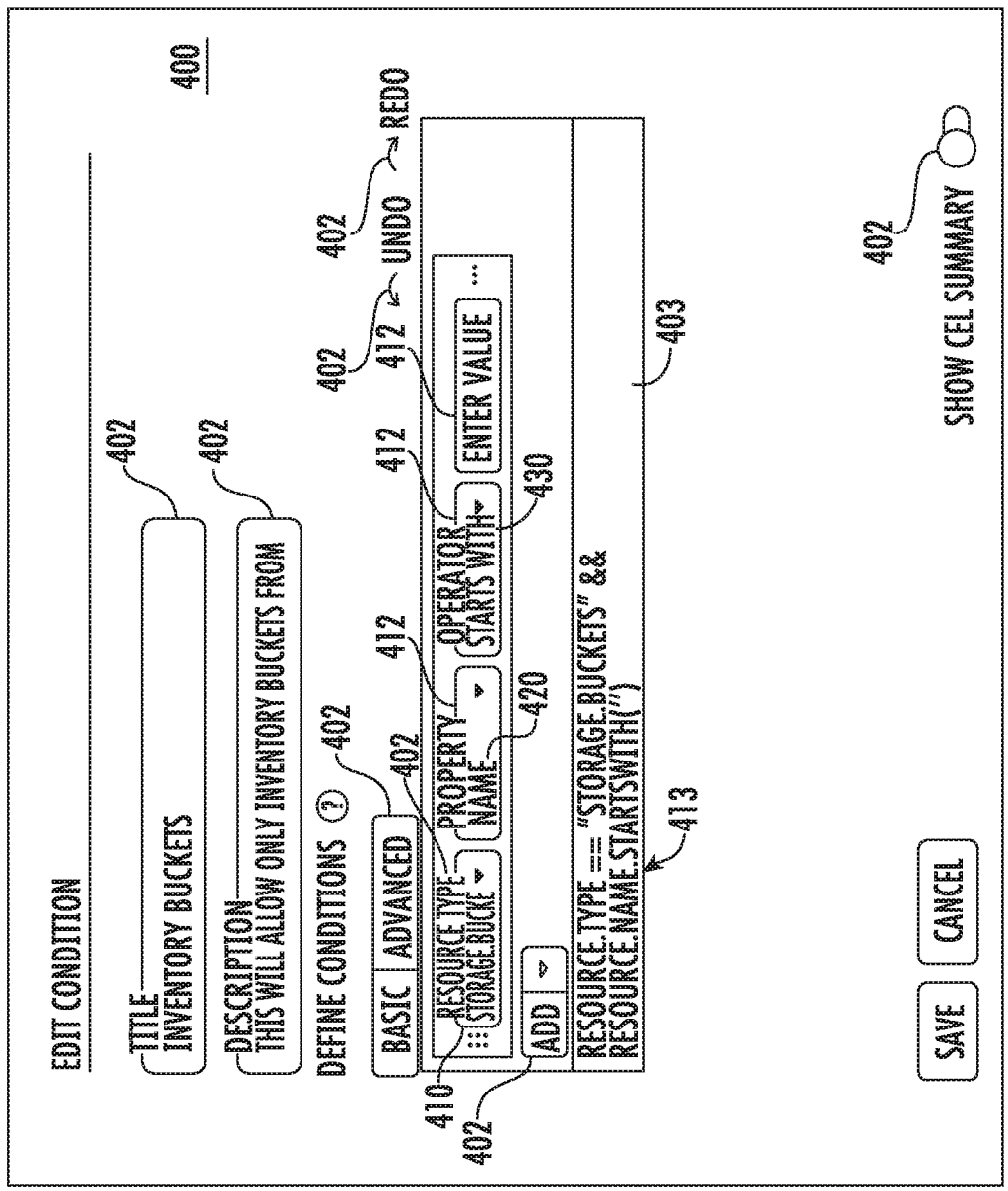

FIG. 4F continues this process displaying the further interaction selecting "starts with" 430 as the operator which generates another new interactive element 412 (e.g., a text box). FIG. 4F also shows that the computer readable code 413 is now updated to include a second line of code based on the user interactions.

Figure 4G:
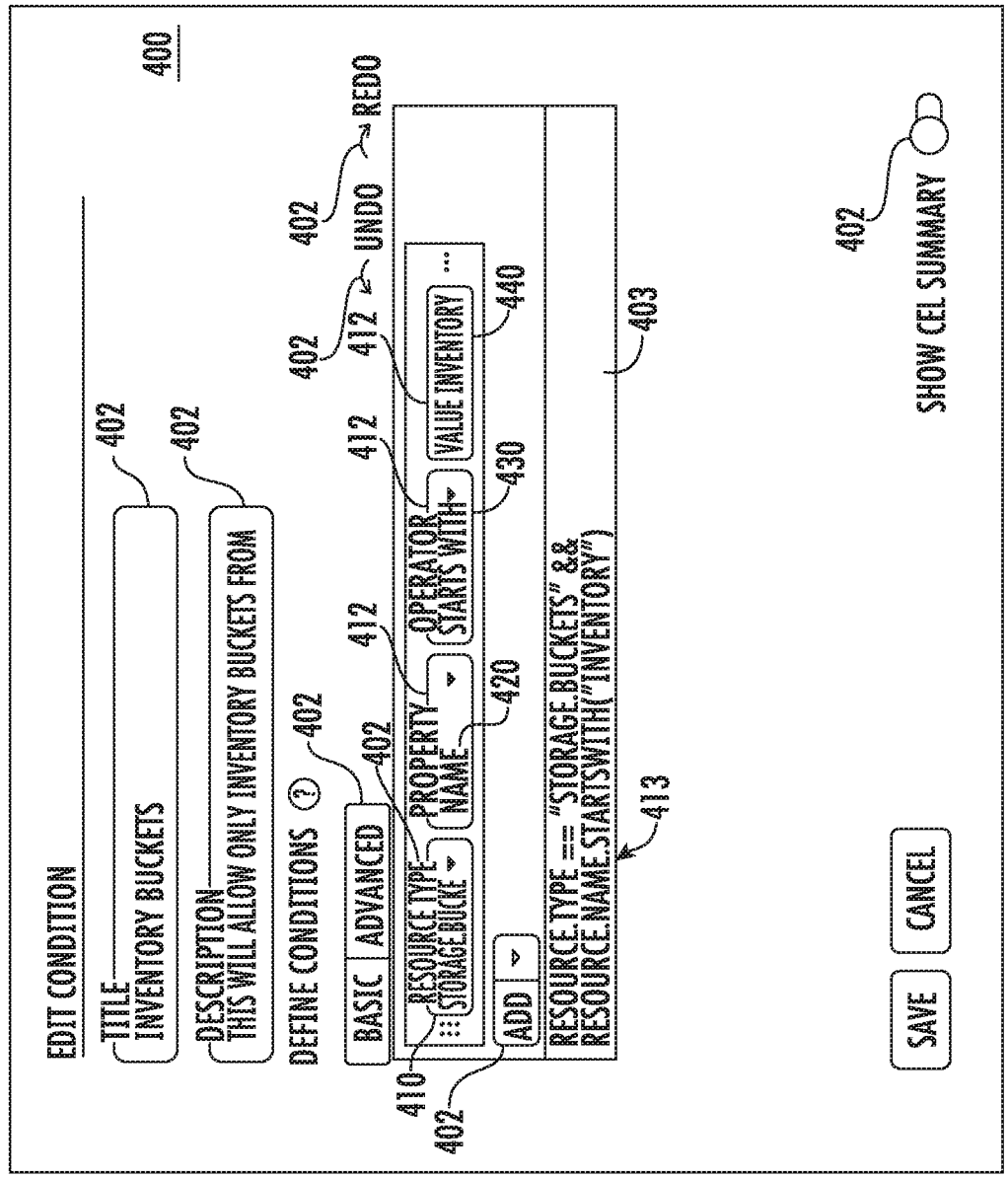

FIG. 4G displays another example of how a user interaction such as inputting "inventory" 440 as the value updates the computer readable code 413. As displayed in the FIGS. 4A-4G, the series of user interactions with the interactive elements 402 and/or new interactive elements 412 can be used to modularly select or otherwise define conditions for a purpose such as allowing only inventory buckets based on the selections. Thus, while a user interacting with the display may have only been familiar with the goal of setting conditions for inventory buckets, the interface can prompt or otherwise intuitively guide a user to make selections based on based on receiving an interaction with one or more interactive elements 402.

Figure 4H:
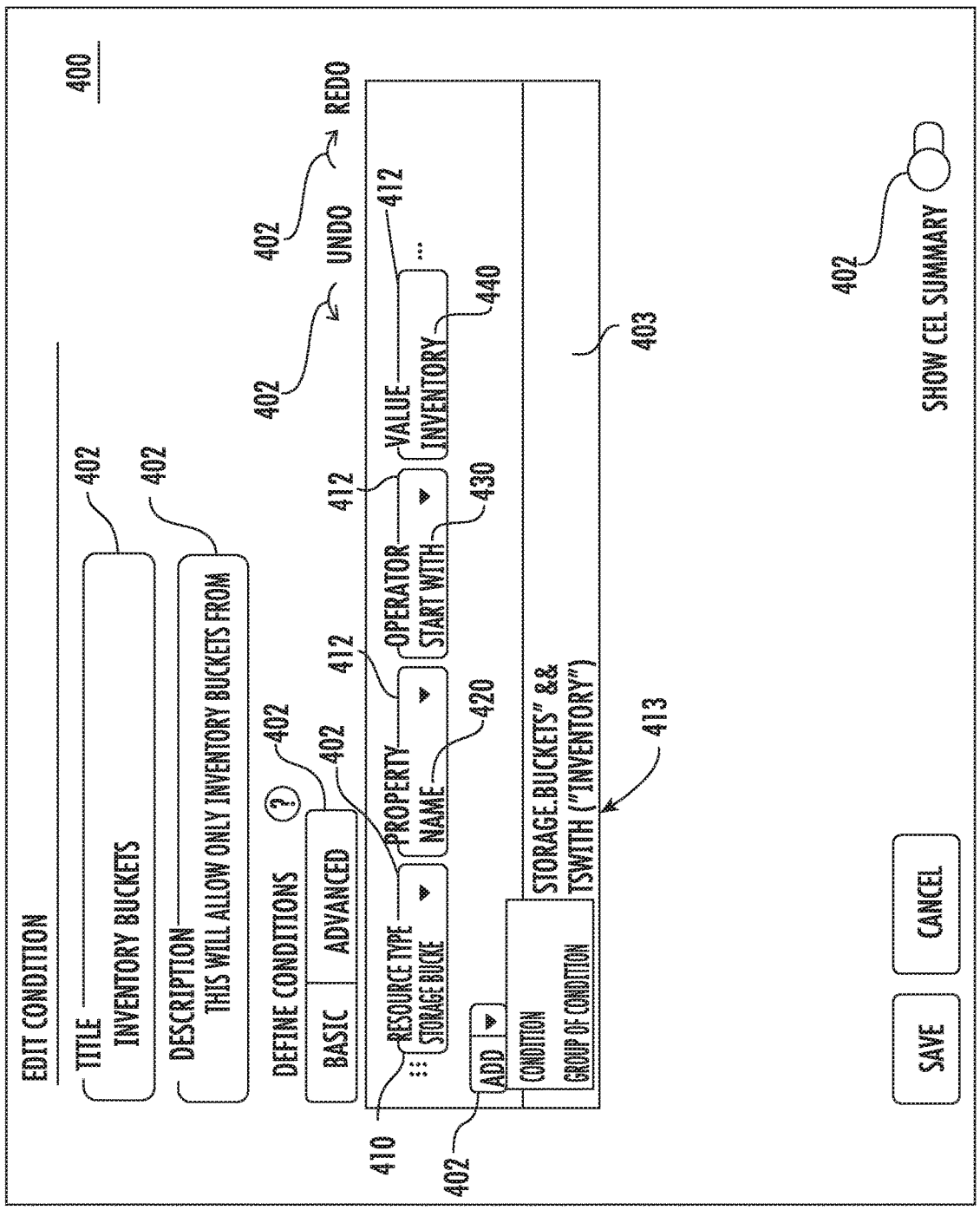

In FIG. 4H, an example interaction is shown with another one of the interactive elements 402 that can allow the interface to generate a new condition or group of conditions. Generally, the totality of user interactions (e.g., selections) may be translated into computer readable code 413 using logic that depends on the language or script for a desired application. For instance, an example user interface 400 according to the disclosure may be included as a software package for managing cloud resources. The software package may include options for database management that may utilize standard query language "SQL", and options for data science using python or a python library. Depending on user interactions with the interface 400, or prior to the interface 400 being provided for display, the interactive elements may be modularly generated or include options that are directed to the functionality desired by a user.

Figure 4I:
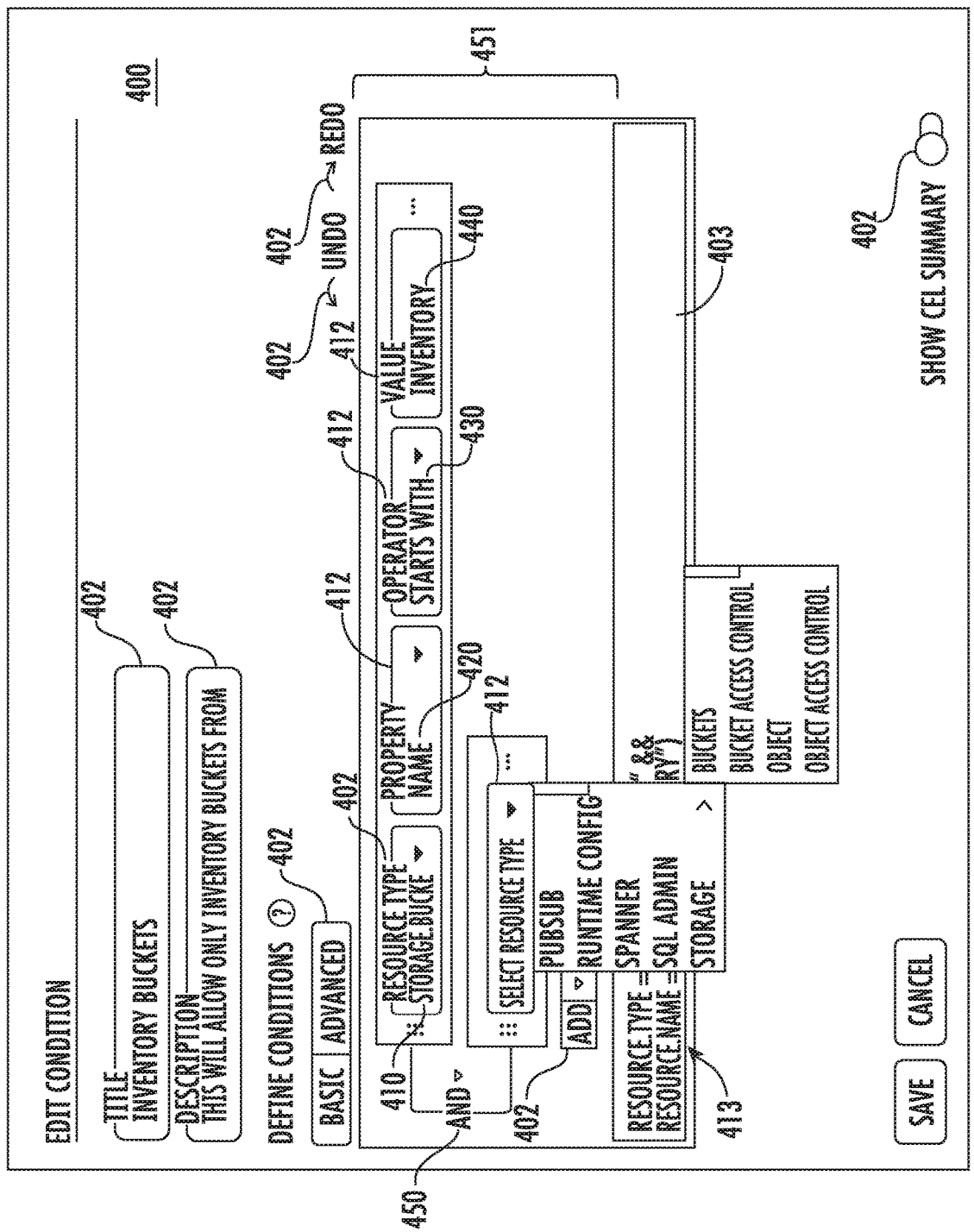

As shown in FIG. 4I, this interaction can include a logical operation 450 (e.g., AND) that can be displayed as an organized grouping 451 (e.g., a hierarchy). Setting this interactive element can be used to tie together the two conditions based on the logical operation. In the case of "AND" both conditions must be satisfied, though other logical operators and their functions can be implemented such as OR, NOT, etc.

Figure 5A:
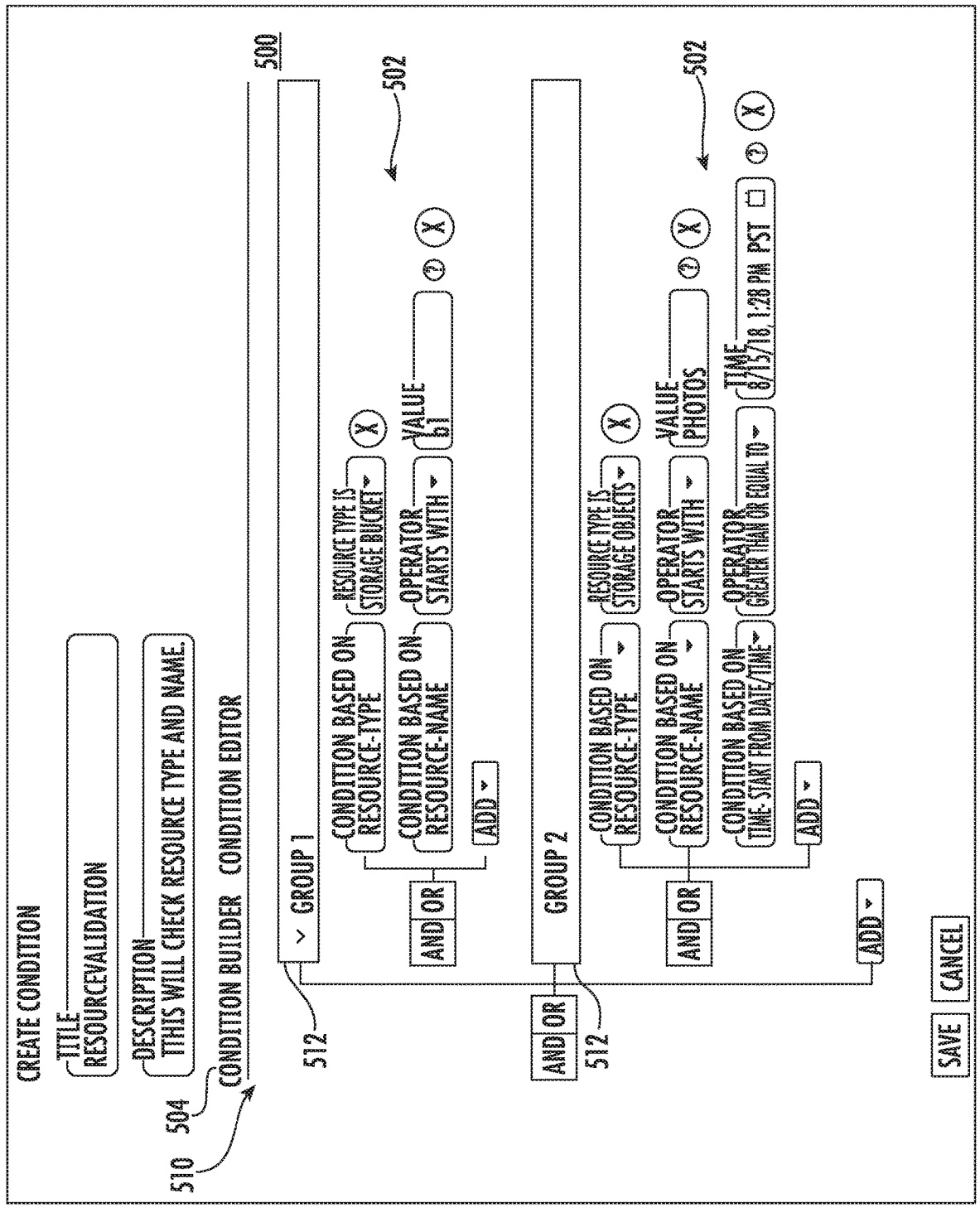

FIGS. 5A and 5B illustrate an example user interface 500 after receiving multiple user interactions with the one or more interactive elements. As shown in FIG. 5A, several logical groupings defined by receiving a user interaction with the one or more interactive elements may be organized in a hierarchy 510 based on one or more logic groupings 512 according to a first mode of operation 504 (e.g., a builder mode). As shown in FIG. 5A, the logic groupings 512 are connected by the operator "Or" so that satisfying either the condition of group 1 or group 2 may be used to satisfy the overall function.

FIG. 5B displays the user interface of FIG. 5A according to a second mode of operation 506 (e.g., an editor mode). In FIG. 5B, the computer readable code 508 embodying the selections defined in the builder mode 504 is provided for display in a text box 520 that the user may edit. Thus a user selection such as clicking on the condition builder tab or the condition editor tab may be used to select the mode by which the user interface operates.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for managing permissions to cloud computing resources, the computing system comprising:
   one or more processors; and
   one or more non-transitory computer-readable media that collectively store instructions that, when executed by the one or more processors, cause the computing system to perform operations, the operations comprising:
      providing, as a portion of a cloud computing service, a user interface operable by an administrator of the cloud computing service in at least two different input modes, the at least two different input modes comprising:
         a builder mode in which the user interface comprises one or more interactive elements that enable the administrator to modularly build one or more modularly-built computer-readable code portions, wherein at least one of the one or more modularly built computer-readable code portions, when executed by the cloud computing service, controls access permissions to one or more cloud computing resources associated with the cloud computing service; and
         an editor mode in which the user interface allows the administrator to directly edit the at least one modularly-built computer-readable code portion;
      wherein a user interaction with the one or more interactive elements included in the builder mode results in generation of the at least one modularly-built computer-readable code portion in real time, and
      wherein the user interface comprises a mode selection element for switching between the at least two different input modes.

2. The computing system of claim 1, wherein an application programming interface is associated with the cloud computing service, wherein the builder mode enables the administrator to modularly build the at least one modularly-built computer-readable code portion that complies with the application programming interface using a plurality of pre-defined application programming interface snippets.

3. The computing system of claim 1, wherein the one or more interactive elements are interrelated and user-toggleable to define different logical combinations of conditions that must be met in order for access to be granted.

4. The computing system of claim 1, wherein the at least one modularly-built computer-readable code portion comprises computer-readable instructions that represent a totality of user interactions with the one or more interactive elements.

5. The computing system of claim 1, wherein the operations further comprise generating an output indicating whether the at least one modularly-built computer-readable code portion produces an error upon executing the at least one modularly-built computer-readable code portion, and said generating is performed without executing the at least one modularly-built computer-readable code portion.

6. The computing system of claim 1, wherein at least one of the one or more interactive elements is configured as an add element, and wherein the add element is configured to add a further interactive element to the builder mode.

7. The computing system of claim 1, wherein the builder mode is configured to display the one or more interactive elements as a hierarchical grouping.

8. The computing system of claim 1, further comprising a resource configured to provide a message to the administrator on interaction with the resource.

9. A computer-implemented method for controlling access to a cloud resource, the method comprising:
  providing, by one or more computing devices and as a portion of a cloud computing service, for display a user interface according to a first mode, wherein the first mode includes one or more interactive elements;
  receiving, by the one or more computing devices, a first user input comprising adjusting one of the interactive elements;
  generating, by the one or more computing devices and based at least in part on the first user input, one or more modularly-built computer-readable code portions, wherein at least one of the one or more modularly built computer-readable code portions, when executed by the cloud computing service, controls access to the cloud resource associated with the cloud computing service;
  receiving, by the one or more computing devices, a second user input comprising adjusting another one of the interactive elements; and
  providing, by the one or more computing devices and based at least in part on the second user input, for display the user interface according to a second mode, wherein the second mode includes the at least one modularly-built computer-readable code portion in an editable format.

10. The computer-implemented method of claim 9, further comprising:
  updating, by the one or more computing devices, the one or more interactive elements based at least in part on the first user input.

11. The computer-implemented method of claim 10, wherein updating the one or more interactive elements comprises providing for display on the user interface at least one additional interactive element.

12. The computer-implemented method of claim 11, wherein updating the one or more interactive elements further comprises: organizing the one or more interactive elements as a hierarchy, and wherein the hierarchy segments the interactive elements that a user has adjusted into one or more logic groupings.

13. The computer-implemented method of claim 12, further comprising reordering the hierarchy, wherein reordering the hierarchy comprises:
  receiving, by the one or more computing devices, a third user input comprising adjusting one of the one or more logic groupings and
  updating, by the one or more computing devices, the at least one modularly-built computer-readable code portion based at least in part on the third user input.

14. The computer-implemented method of claim 9, wherein generating the at least one modularly-built computer-readable code portion occurs substantially in real-time.

15. The computer-implemented method of claim 9, wherein the one or more interactive elements comprise at least one field having a pre-defined list for selection by a user.

16. The computer-implemented method of claim 9, wherein the first mode further includes a non-editable region displaying the at least one modularly-built computer-readable code portion.

17. A computing system configured to control access to a cloud resource, the computing system comprising:
  one or more processors; and
  one or more non-transitory computer-readable media that collectively store instructions that, when executed by the one or more processors cause the computing system to perform operations, the operations comprising:
    providing, by one or more computing devices and as a portion of a cloud computing service, for display a user interface comprising a first mode and a second mode, wherein the first mode includes one or more interactive elements;
    receiving, by the one or more computing devices, a first user input comprising adjusting one of the interactive elements; and
    generating, by the one or more computing devices and based at least in part on the first user input, one or more modularly-built computer-readable code portions, wherein at least one of the one or more modularly built computer-readable code portions, when executed by the cloud computing service, controls access to the cloud resource associated with the cloud computing service;
    wherein the second mode includes a text-editable area containing the at least one modularly-built computer-readable code portion.

18. The computing system of claim 17, wherein the operations further comprise:
  updating, by the one or more computing devices, the one or more interactive elements based at least in part on the first input.

19. The computing system of claim 18, wherein updating the one or more interactive elements further comprises: organizing the one or more interactive elements as a hierarchy, and wherein the hierarchy segments the interactive elements that a user has adjusted into one or more logic groupings.

20. The computing system of claim 17, wherein the one or more interactive elements are interrelated and user-toggleable to define different logical combinations of conditions that must be met in order for access to be granted.

\* \* \* \* \*